United States Patent [19]

Saunders

[11] 4,262,058

[45] Apr. 14, 1981

[54] CURL RESISTANT LABEL AND METHOD OF MAKING SAME

[75] Inventor: Mary S. Saunders, Chesterfield, Va.

[73] Assignee: Reynolds Metals Company, Richmond, Va.

[21] Appl. No.: 126,340

[22] Filed: Mar. 3, 1980

Related U.S. Application Data

[63] Continuation-in-part of Ser. No. 38,687, May 14, 1979, abandoned.

[51] Int. Cl.[3] .................................... B32B 9/04

[52] U.S. Cl. .................................... 428/537; 260/403; 427/411; 427/409; 428/411; 428/543

[58] Field of Search .................................... 260/403; 156/75; 428/411, 543, 537; 106/207; 427/409, 411, 428

[56] References Cited

U.S. PATENT DOCUMENTS

| | | | |
|---|---|---|---|
| 1,604,887 | 10/1926 | Lant | 428/319 |
| 2,069,971 | 2/1937 | Schneider | 106/171 |
| 2,086,903 | 7/1937 | Ellis | 428/481 |
| 2,466,393 | 4/1949 | Dickey et al. | 260/403 |
| 3,098,780 | 7/1963 | Krause | 156/280 |
| 3,321,420 | 5/1967 | Unger | 260/17 R |

*Primary Examiner*—George F. Lesmes
*Assistant Examiner*—E. Rollins Buffalow
*Attorney, Agent, or Firm*—Glenn, Lyne, Girard & McDonald

[57] ABSTRACT

A curl resistant paper-based label. The label includes a coating on the paper layer of the label of a lecithin compound. This compound provides curl resistance properties to the label, water holdout properties to the label and increases the flexibility of the label. A method involves coating the lecithin compounds onto the paper layer of the these labels.

21 Claims, No Drawings

CURL RESISTANT LABEL AND METHOD OF MAKING SAME

CROSS REFERENCE TO RELATED APPLICATIONS

This is a continuation-in-part of U.S. Application Ser. No. 38,687, filed May 14, 1979 now abandoned.

BACKGROUND OF THE INVENTION

Paper-based labels for bottles, cans and other containers are commonly employed. As used throughout this specification, the term paper-based label refers to a label, either coated and/or laminated, including a paper layer. Examples of such paper-based labels include metallic foil-paper laminated labels, such as aluminum foil-paper laminated labels, metallized paper labels, such as aluminized paper labels, coated paper labels, such as varnished paper labels, and plastics resin film-paper laminated labels. When using these paper-based labels, the labels are stacked into a labeling machine which transfers the labels from the stack to the containers to be labeled.

As speeds of the labeling machines have increased, i.e., increased numbers of labels and containers being handled per unit time, it has become increasingly important that the labels remain as flat as possible as they are stacked into the labeling machines. Paper-based labels do not lie flat well, of themselves, especially under conditions of excessive humidity.

Another highly desirably property for a label is water holdout. Water holdout is the ability of a material to resist water penetration. Paper generally has extremely poor water holdout properties and must thus be treated to provide these properties. When treated, these labels will provide improved gluability to the bottles, cans and other containers on which they will be placed.

Still another property desired for labels, which must feed efficiently through a magazine on the labeling equipment and be molded around the bottles, cans, and other containers, is flexibility. If the labels do not have a high degree of flexibility, tearing or jamming of the labels in the labeling machine can occur when the labeling machine attempts to place the labels on the containers.

U.S. Pat. No. 3,098,780 discloses only a method of application of treatings to the paper layer of a laminated metallic foil-paper label for increasing the curl resistance of the label by preventing the paper layer from picking up moisture. No mention is made, however, of either providing a label with a higher degree of flexibility or a higher degree of water holdout. Further, this patent requires that the paper layer be flooded with the treating solution and dried to a specific moisture content. Such flooding wastes valuable treating compound and controlled application of the compound is difficult. Thus, it is desirable to avoid this procedure.

THE PRESENT INVENTION

By means of the present invention, a curl resistant paper-based label is produced which has excellent water holdout and flexibility properties. Further, the label is produced using coating techniques which do not require flooding of the paper layer to provide sufficient treatment thereto.

The labels of the present invention include a lecithin coating on the paper layer. This coating is placed on the paper layer in an amount sufficient to provide curl resistance properties, but in an amount insufficient to cause loss of paper strength.

DETAILED DESCRIPTION OF THE PREFERRED EMBODIMENTS

The base stock for the label of the present invention is a paper-based label, and may be, for example, a typical metallic foil-paper laminate, a metallized paper or a varnished paper. When a metallic foil-paper laminate is employed, the metallic foil layer may be any of the typically-known packaging foils, such as tin, lead and aluminum. Preferably, this layer is an aluminum foil layer. The thickness of this layer may typically range from about 0.0002 to 0.001 inches (0.000508 to 0.00254 centimeters). When a metallized paper is employed, the metal, which may again be any packaging metal, such as aluminum, tin or lead, and which is preferably aluminum, may typically range from about 0.00001 to 0.0001 inches (0.0000254 to 0.000254 centimeters). When a varnished paper is employed, the varnish is coated onto the paper layer in an amount ranging between about 1 pound per 3000 square feet to 6 pounds per 3000 square feet (0.00163 to 0.00976 kilograms per square meter). The paper layer may be almost any cellulosic paper, such as kraft paper, groundwood paper, litho paper or tissue paper. This paper layer typically has a thickness ranging from about 0.0015 to 0.006 inches (0.000381 to 0.01524 centimeters). Some papers which are grease resistant may not accept treatment according to the present invention. When a metallic foil-paper laminate is employed, the metallic foil and paper layers are bonded together by bonding adhesives typically used in the formation of labels, such as waxes, caseins and latexes, such as neoprene and styrene-butadient resins, and the like, and combinations thereof.

The coating material for the paper layer is a phospholipide compound. As used in this application, the term lecithin compound refers to phospholipide compounds having the general emperical formula:

$$CH_2(R)\,CH\,(R')\,CH_2\,OPO(OH)\,O\,(CH_2)_2\,N(OH)\,X\,Y\,Z \quad (1)$$

or $$CH_2\,(R)\,CH\,(R')\,CH_2\,OPO_3\,(CH_2)_2\,NO\,X\,Y\,Z \quad (2)$$

where X Y and Z are H or $CH_3$ and R and R' are groups of the following general formula:

$$OCOC_nH_{2n+1}$$

with n ranging from 4 to 30 and the structural formulas, respectively:

(1.)

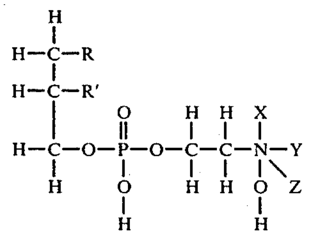

and

-continued

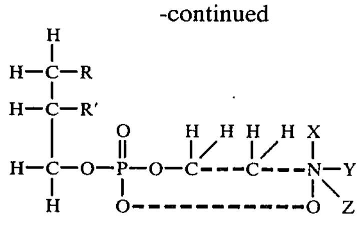
(2.)

The lecithin can be any of several waxy hydroscopic phosphatides derived from egg yolk or other animal and vegetable sources, particularly soybean oil and corn oil. These phosphatides are the mixtures of the diglyceride residues of carboxylic acids, commonly called fatty acids, such as stearic, palmitic, maleic and oleic acids, chemically linked to the choline ester of phosphoric acid. These diglyceride residues are the R and R' groups shown in the chemical formulas. The R and R' groups may be residues from the same carboxylic acid, but more commonly they are different. Likewise, the X, Y and Z groups may be the same, but more commonly they are different.

The lecithin compounds are coated onto the paper layer of the paper-based label from a water dominated solution. The water solution may contain from about 1 to 30 percent, by weight, lecithin; 0 to 20 percent by weight of a compatible solvent, such as ethyl alcohol, isopropyl alcohol or acetone, and the balance water. It is preferred that this solvent be an alcohol solvent. It is also preferred that there be at least some solvent in the solution, since the solvent changes the basically thixotropic nature of the lecithin-water solution and thus improves the coatability of this material.

The coating of the paper layer with the lecithin compound may be accomplished by kiss rolls, calendaring, gravure coating and the like to provide a controlled application. It is preferred that the coating operation be accomplished by gravure application. The amount of coating placed on the paper layer should provide a dried residue of the coating material on the paper layer ranging between about 1.5 to 4.5 percent by weight of the paper, and preferably about 3 percent by weight of the paper. Below about 1.5 percent the coating does not significantly add to the curl resistance and water holdout properties of the label. Above about 4.5 percent by weight, there is a loss of paper strength in the paper layer.

It is surprising that the lecithin compounds of the present invention provide the curl resistance and water holdout properties which have been found, since, lecithins are hydrophillic in nature. That is, they attract water. However, when used in the present invention, the lecithin coating retards water penetration into the paper layer. Further, this water penetration resistance increases as the labels are aged.

If the label is not printed, labels formed as above may be stored in rolls, in stacks of sheets of pluralities of labels or as stacks of individually cut labels. However, if the label is printed, the printing must be overcoated with a non-blocking overcoat with respect to the lecithin coating to prohibit adherence between labels and to prevent migration of the printing into the lecithin coating. Examples of film-forming coatings which provide block resistance against the lecithin compounds employed in the present invention include waxed and dewaxed shellac, nitrocellulose resins, cellulose acetate propionate resins and cellulose acetate butyrate resins. The thickness of the overcoat coatings is not vital, however, this coating must be continuous, i.e., it cannot have openings therein through which migration could occur.

EXAMPLE I

In accordance with the principles of the present invention, labels were formed of aluminum foil having a thickness of 0.0003 inches (0.00762 centimeters) bonded to 30 pound per 3000 square foot (0.04882 kilogram per square meter) groundwood paper having a thickness of 0.0025 inches (0.00635 centimeters) by means of a casein/latex adhesive.

These laminates were then coated on the paper side with a lecithin compound having the chemical formula:

$$C_{42}H_{84}NPO_8$$

and the basic chemical structure:

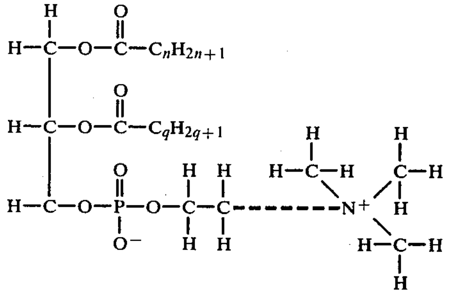

where $n+q=32$ sold by Amercian Lecithin Company under the trade name ALCOLEC, by means of gravure coating resulting in a dried residue on the paper layer of 3.0 percent by weight of the paper layer.

The lecithin coating composition was formed of 25 percent by weight of the above lecithin compound, 63 percent by weight of water and 12 percent by weight of isopropyl alcohol.

The labels were printed and a cellulose acetate propionate overcoat was coated onto the printed layer.

The labels formed in the above manner showed excellent curl resistance properties and flexibility and had an average water holdout rate of 180 seconds.

EXAMPLE II

Labels were formed of an aluminum metallized groundwood paper, with the groundwood paper having a thickness of 0.0025 inches (0.0635 centimeters) and gravure coated with ALCOLEC as in Example I to give a dried residue of 3.0 percent by weight of the paper layer.

The labels formed in the above manner showed excellent curl resistance properties and flexibility and had an average water holdout rate of 115 seconds.

EXAMPLE III

Labels were next formed of 30 pound per 3000 square foot (0.04882 kilogram per square meter) one side clay coated paper having a thickness of 0.0025 inches (0.00635 centimeters) having coated on the clay side 4 pounds per 3000 square feet (0.00651 kilograms per square meter) of a cross-linked alkyd resin and gravure coated on the side opposite the resin with ALCOLEC as in the previous Examples.

The labels formed showed excellent curl resistance properties and flexibility and had an average water holdout rate of 130 seconds.

EXAMPLE IV

Labels were then formed of 30 pound per 3000 square foot (0.04882 kilogram per square meter) one side clay coated paper having a thickness of 0.0025 inches (0.00635 centimeters) having coated on the clay side 4 pounds per 3000 square feet (0.00651 kilograms per square meter) of a nitrocellulose-based coating and again coated on the side opposite the resin with ALCO-LEC as in the previous Examples.

The labels formed again showed excellent curl resistance properties and flexibility and had an average water holdout rate of 130 seconds

EXAMPLE V

Labels were finally formed of 25 pound per 3000 square foot (0.0407 kilogram per square meter) bleached bond paper laminated to 0.001 inch (0.00254 centimeter) low density polyethylene film by extrusion. The paper side of the laminate was gravure coated with ALCO-LEC as in the previous Examples.

The labels formed showed good curl resistance and flexibility properties and had and average water holdout rate of 50 seconds.

From the foregoing, it is clear that the present invention provides an improved paper-based label and method of producing same.

While present preferred embodiments of the invention have been described, it will be understood that the invention may be otherwise variously embodied and practiced within the scope of the following claims.

I claim:

1. In a paper-based label the improvement wherein said label has a coating of a lecithin compound thereon in an amount sufficient to provide curl resistance and water holdout to the label.

2. The label of claim 1 wherein said label is selected from the group consisting of metallic foil-paper laminated labels, metallized paper labels, coated paper labels and plastics film-paper laminated labels.

3. The label of claim 2 wherein said label is an aluminum foil-paper laminated label.

4. The label of claim 2 wherein said label is an aluminized paper label.

5. The label of claim 2 wherein said label is a varnished paper label.

6. The label of claim 2 wherein said paper is a groundwood paper.

7. The label of claim 1 wherein said lecithin compound is coated onto said label in an amount to provide a dried residue of between about 1.5 percent and 4.5 percent by weight of the paper.

8. The label of claim 7 wherein said lecithin compound is coated onto said label in an amount to provide a dried residue of about 3 percent by weight of the paper.

9. The label of claim 1 wherein said label includes a printed layer and wherein said label further includes a non-blocking overcoat with respect to the lecithin compound on said printed layer.

10. In a method of forming a paper-based label the improvement comprising coating said label with a lecithin compound in an amount sufficient to provide curl resistance and water holdout to said label.

11. The method of claim 10 wherein said label is selected from the group consisting of metallic foil-paper laminated labels, metallized paper labels, coated paper labels, and plastics film-paper laminated labels.

12. The method of claim 11 wherein said label is an aluminum foil-paper laminated label.

13. The method of claim 11 wherein said label is an aluminized paper label.

14. The method of claim 11 wherein said label is a varnished paper label.

15. The method of claim 11 wherein said paper is a groundwood paper.

16. The method of claim 10 wherein said lecithin compound is coated onto said label in an amount to provide a dried residue of between about 1.5 percent and 4.5 percent by weight of the paper.

17. The method of claim 16 wherein said lecithin compound is coated onto said label in an amount to provide a dried residue of about 3 percent by weight of the paper.

18. The method of claim 10 wherein said lecithin compound is coated onto said label from a water dominated solution.

19. The method of claim 18 wherein said water dominated solution includes up to about 20 percent by weight of a solvent compatible with the lecithin compound and the water.

20. The method of claim 18 wherein said lecithin compound is coated onto said label by gravure coating.

21. The method of claim 10 further comprising printing said label and coating said printing with an overcoat which is non-blocking with respect to the lecithin compound.

* * * * *